(12) United States Patent
Nieminen et al.

(10) Patent No.: US 11,905,477 B2
(45) Date of Patent: Feb. 20, 2024

(54) METHOD AND PROCESS ARRANGEMENT FOR PRODUCING HYDROCARBONS

(71) Applicant: TEKNOLOGIAN TUTKIMUSKESKUS VTT OY, Espoo (FI)

(72) Inventors: Matti Nieminen, Espoo (FI); Matti Reinikainen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 16 days.

(21) Appl. No.: 17/432,541

(22) PCT Filed: Feb. 21, 2020

(86) PCT No.: PCT/FI2020/050111
§ 371 (c)(1),
(2) Date: Aug. 20, 2021

(87) PCT Pub. No.: WO2020/169888
PCT Pub. Date: Aug. 27, 2020

(65) Prior Publication Data
US 2022/0145194 A1    May 12, 2022

(30) Foreign Application Priority Data
Feb. 21, 2019   (FI) ...................... 20195132

(51) Int. Cl.
*C10J 3/48*   (2006.01)
*C08J 11/14*   (2006.01)

(52) U.S. Cl.
CPC .............. *C10J 3/482* (2013.01); *C08J 11/14* (2013.01); *C10J 2300/0946* (2013.01);
(Continued)

(58) Field of Classification Search
CPC ........ C10J 2300/0946; C10J 3/58; C10J 3/60; C10J 3/62; C10J 3/64; C10J 3/721; C01B 2203/141
See application file for complete search history.

(56) References Cited

U.S. PATENT DOCUMENTS 4,183,733 A  *  1/1980  Jager ..................... C01B 3/34
                                                     48/77
6,084,139 A  *  7/2000  Van Der Giessen ... C10B 53/02
                                                     201/2.5
(Continued)

FOREIGN PATENT DOCUMENTS

CN      106062145 B     6/2019
JP      2004035750 A    7/2002
(Continued)

OTHER PUBLICATIONS

Wilk V et al: "Conversion of mixed plastic wastes in a dual fluidized bed steam gasifier", Fuel, IPC Science and Technology Press, Guildford, GB, vol. 107, Feb. 15, 2013 (Feb. 15, 2013), pp. 787-799.
(Continued)

*Primary Examiner* — Imran Akram
(74) *Attorney, Agent, or Firm* — Brooks Kushman P. C.; John E. Nemazi

(57) ABSTRACT

A method and process arrangement for producing hydrocarbons from polymer-based waste in which the polymer-based waste is gasified with steam at low temperature in a gasifier for forming a product mixture, and the temperature is 640-750° C., and the product mixture is supplied from the gasifier to a recovery unit of the hydrocarbons for separating at least one hydrocarbon fraction.

12 Claims, 1 Drawing Sheet

(52) U.S. Cl.
CPC .......... *C10J 2300/0976* (2013.01); *C10J 2300/1656* (2013.01); *C10J 2300/1671* (2013.01); *C10J 2300/18* (2013.01)

(56) References Cited

U.S. PATENT DOCUMENTS

| | | | | |
|---|---|---|---|---|
| 6,178,899 | B1* | 1/2001 | Kaneko | ............ F23G 5/006 110/235 |
| 2004/0232046 | A1* | 11/2004 | Tanaka | ............ C10G 9/38 422/600 |
| 2006/0233687 | A1* | 10/2006 | Hojlund Nielsen | ....... C10J 3/00 502/55 |
| 2011/0104575 | A1* | 5/2011 | Mui | ............ C01B 3/36 48/197 R |
| 2011/0248218 | A1 | 10/2011 | Sutradhar et al. | |
| 2015/0299590 | A1* | 10/2015 | Keeler | ............ C10K 1/04 252/373 |
| 2016/0068772 | A1* | 3/2016 | Appel | ............ C10J 3/84 422/618 |
| 2016/0311683 | A1* | 10/2016 | Spitzl | ............ D06F 57/12 |
| 2017/0073594 | A1* | 3/2017 | Wada | ............ C10J 3/86 |
| 2017/0218284 | A1* | 8/2017 | Liss | ............ C10K 3/005 |
| 2017/0233667 | A1* | 8/2017 | Harandi | ............ C10G 9/005 252/373 |
| 2018/0312767 | A1* | 11/2018 | Al-Sayed | ............ C01B 3/36 |

FOREIGN PATENT DOCUMENTS

| | | |
|---|---|---|
| JP | 2006328328 A | 12/2006 |
| JP | 2015160163 A | 9/2015 |
| NL | 1016093 C1 | 10/2001 |
| WO | WO0009771 A1 | 2/2000 |
| WO | 07069449 A1 | 6/2007 |

OTHER PUBLICATIONS

Toshiro Tsuji et al.: "Gasification of waste plastics by steam reforming in a fluidized bed", Journal of Material Cycles and Waste Management, Springer Japan KK, JP, vol. 11, No. 2, Jun. 25, 2009 (Jun. 25, 2009), pp. 144-147.

International Search Report of PCT/FI2020/050111, prepared by the European Patent Office, dated May 12, 2020, 4 pages.

Parparita et al., "Gas production by steam gasification of polypropylene/ biomass waste composites in a dual-bed reactor" Journal of Material Cycles and Waste Management • Sep. 2014, 14 pages.

Chinese Office Action for CN Application 202080028279.8, dated Apr. 22, 2023, 12 pages including the English Machine Translation.

Indian Office Action for 202117039010, dated Apr. 12, 2023, 5 pages, including English Translation.

* cited by examiner

US 11,905,477 B2

METHOD AND PROCESS ARRANGEMENT FOR PRODUCING HYDROCARBONS

CROSS-REFERENCE TO RELATED APPLICATION

This application is the U.S. national phase of PCT Application No. PCT/FI2020/050111 filed on Feb. 21, 2020, which claims priority to FI Patent Application No. 20195132 filed on Feb. 21, 2019, the disclosures of which are incorporated in their entirety by reference herein.

FIELD

The application relates to a method defined in claim 1 and a process arrangement defined in claim for producing hydrocarbons, e.g. olefins. Further, the application relates to a use of the method defined in claim 21.

BACKGROUND

Known from the prior art is to produce hydrocarbons and olefins from fossil raw material by a cracking process. Further, it is known from the prior art that different olefin fractions can be separated by a recovery process.

Further, it is known from the prior art that waste plastic is difficult to recycled and to utilize as raw material in new products. Mechanical recycling is the cheapest way to recycle but its applicability is limited to clean plastic, and mechanically recycled plastic is typically used in lower level applications.

OBJECTIVE

The objective is to disclose a new type method and process arrangement for producing hydrocarbons, such as olefins, from waste raw material. Further, the objective is to disclose a new type method and process arrangement for utilizing polymer-based waste as raw material. Further, the objective is to replace virgin fossil raw material in olefin production.

SUMMARY

The method and process arrangement and use are characterized by what are presented in the claims.

In the method and process arrangement, hydrocarbons, e.g. olefins, are produced from polymer-based waste by treating the polymer-based waste by means of gasification in a gasifier to form a product mixture and the hydrocarbons are separated from the product mixture in a recovery unit.

BRIEF DESCRIPTION OF THE DRAWINGS

The accompanying drawings, which are included to provide a further understanding of the invention and constitutes a part of this specification, illustrate some embodiments of the invention and together with the description help to explain the principles of the invention. In the drawings.

DETAILED DESCRIPTION

Figure 1:
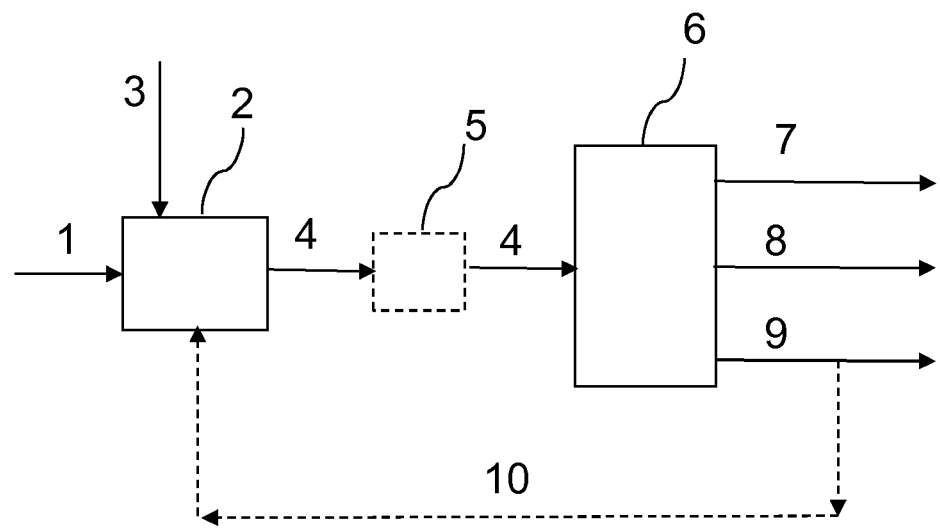
FIG. 1 is a flow chart illustration of a process according to one embodiment.

In the method for producing hydrocarbons from polymer-based waste, the polymer-based waste (1) is gasified with steam (3) at low temperature in a gasifier (2) for forming a product mixture (4), and the temperature is 640-750° C. in the gasifier, and the product mixture (4) is supplied from the gasifier (2) to a recovery unit (6) of the hydrocarbons for separating at least one desired hydrocarbon fraction (7, 8, 9).

The process arrangement for producing hydrocarbons from polymer-based waste comprises a gasifier (2) in which the polymer-based waste (1) is gasified with steam (3) at low temperature which is 640-750° C. for forming a product mixture (4), a steam inlet for supplying the steam (3) to the gasifier (2), and a recovery unit (6) into which the product mixture (4) is supplied from the gasifier (2) and in which at least one desired hydrocarbon fraction (7, 8, 9) is separated.

Figure 2:
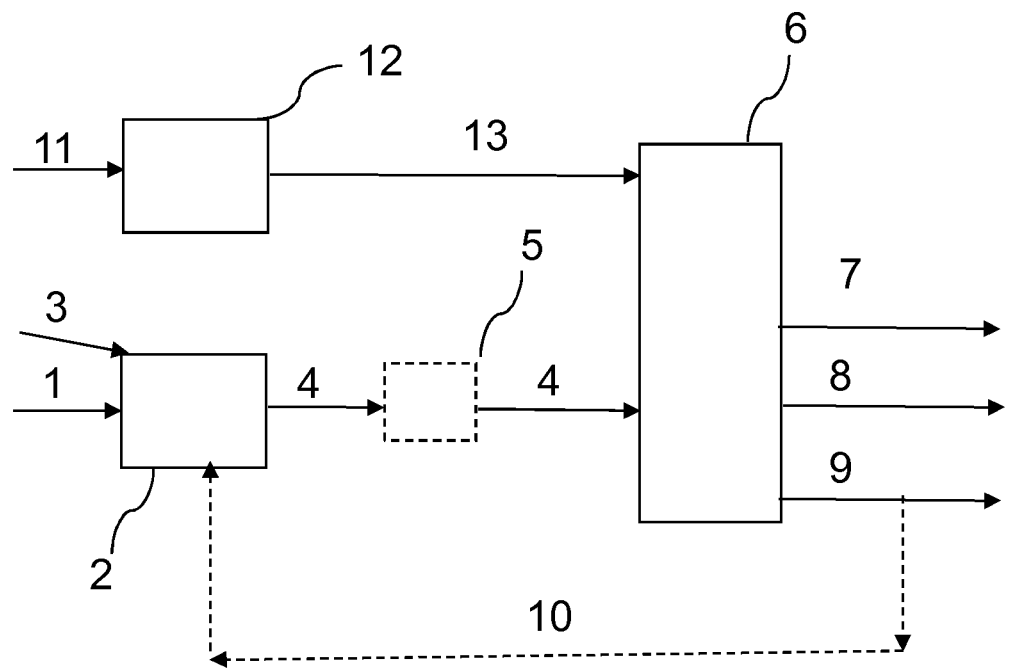
FIG. 2 is a flow chart illustration of a process according to another embodiment.

One embodiment of the method and the process arrangement is shown in FIG. 1. Another embodiment of the method and the process arrangement is shown in FIG. 2.

In this context, the polymer-based waste (1) means any waste which comprises polymer or polymers, or which consists of one or more polymers. Often the polymer-based waste is a heterogenous material. In one embodiment, the polymer-based waste comprises at least polyolefins, e.g. polyethylene or polypropylene. The polymer-based waste may contain also other polymers. Further, the polymer-based waste may contain also other components, such as paper, cardboard and/or aluminium material. In one embodiment, the polymer-based waste is a mixed plastic material. In one embodiment, the polymer-based waste comprises multi-layer plastic packages and products. In one embodiment, the polymer-based waste comprises polyolefins over 80 w-%, preferably over 90 w-%. In one embodiment, the polymer-based waste comprises polyolefins below 80 w-%, in one embodiment below 70 w-%, in one embodiment below 60 w-% and in one embodiment below 50 w-%. In one embodiment, the polymer-based waste comprises PVC plastic, in one embodiment below 2 w-%. In one embodiment, the polymer-based waste, i.e. the feed of the gasifier (2), is in a solid form, e.g. in the form of shredded material. In one embodiment, the polymer-based waste is treated before the supply into the gasifier, for example by means of grinding, milling, chopping, shredding, briquetting, pelletizing or other means of compacting. In one embodiment, particle sizes of the polymer-based waste can vary, for example between 0.1 mm-100 mm in flat form particles and for example 0.1 mm-30 mm in spherical form particles. In one embodiment, the polymer-based waste is inertisized with nitrogen, for example to decrease oxygen from the feed, before the supply into the gasifier.

In this context, the product mixture (4) means any product mixture, such as product gas, from the gasifier (2). Usually the product mixture is a mixture of hydrocarbons, and further may comprise carbon monoxide and hydrogen. The product mixture comprises one or more components. In one embodiment, the product mixture may contain ethylene, propylene, butadiene, aromatic hydrocarbons and/or other hydrocarbons. In one embodiment, the product mixture comprises at least light hydrocarbons, such as C1-C6 hydrocarbons. In one embodiment, the product mixture comprises at least olefins. In one embodiment, the product mixture comprises at least ethylene. In one embodiment, the product mixture comprises at least ethylene, propylene and light aromatic hydrocarbons, such as benzene or toluene. In one embodiment, the product mixture further comprises hydrogen and/or carbon monoxide. Further, the product mixture may contain also other components or compounds, e.g. solid components, such as solid particles or solid impurities. In one embodiment, the product mixture is an olefin-rich product mixture. In one embodiment, the product mixture is an ethylene-rich product mixture.

In this context, the gasification in a gasifier means any gasification process by steam. The gasification is a process that converts starting material into gasification products, e.g. hydrocarbons and hydrogen. This is achieved by treating the starting material at suitable temperatures, with a controlled amount of steam and/or additional oxygen.

In one embodiment, the gasifier (2) is arranged in parallel with one or more known cracking unit (12), in which the cracking unit comprises at least one cracking device, such as a steam cracker. In one embodiment, the gasifier (2) is arranged in parallel with at least one cracking unit (12). In one embodiment, the process arrangement comprises at least one cracking unit (12) which is arranged in parallel with the gasifier (2). In said cracking unit (12), a hydrocarbon mixture (13) of the cracking unit is produced by cracking from other raw material (11), such as crude oil derived distillates or their upgraded products, e.g. naphtha, ethane or propane. Then both the product mixture (4) from the gasifier (2) and the hydrocarbon mixture (13) of the cracking unit (12) can be supplied the recovery unit (6), or to a desired step or device of the recovery unit (6), and the product mixture (4) is a portion of a feed to the recovery unit (6). In one embodiment, the product mixture (4) and the hydrocarbon mixture (13) of the cracking unit can be supplied to the same step or device of the recovery unit (6). In one embodiment, the product mixture (4) and the hydrocarbon mixture (13) of the cracking unit can be supplied to the different steps or devices of the recovery unit (6). In this context, the hydrocarbon mixture (13) of the cracking unit means any hydrocarbon-containing mixture which comprises at least olefins, such as ethylene, propylene and/or other olefins. Further, the hydrocarbon mixture (13) may be comprise other hydrocarbons and/or other components.

In one embodiment, the gasifier (2) is a fluidized bed gasifier. Any suitable bed material can be used as the fluiding material in the fluidized bed. In one embodiment, the bed material is sand and/or calcium-containing bed material, such as lime, limestone, dolomite, $CaCO_3$ or CaO. In one embodiment, the bed material contains 0-100 w-% sand and 100-0 w-% calcium-containing bed material. In one embodiment, the bed material consists of sand. In one embodiment, the bed material consists of calcium-containing bed material. In one embodiment, the bed material contains below 60 vol-%, in one embodiment below 50 vol-%, in one embodiment below 30 vol-%, calcium-containing bed material. In one embodiment, $Al_2O_3$ is added to the bed material. In one embodiment, the bed material may comprise 0.1-100 vol-% $Al_2O_3$.

In one embodiment, the treatment temperature is over 700° C., e.g. between 700-750° C. in the gasifier (2). In one embodiment, the treatment temperature is 710-740° C., and in one embodiment 720-730° C. In one embodiment, the treatment temperature is 690-730° C., and in one embodiment 700-720° C. In one embodiment, the treatment temperature is 640-700° C. In one embodiment, the treatment temperature is 640-670° C.

In one embodiment, the treatment is carried out under atmospheric pressure in the gasifier (2). In one embodiment, the treatment is carried out at a pressure of below 4 bar, in one embodiment below 3 bar and in one embodiment below 2 bar.

In one embodiment, a residence time in the gasifier (2) is clearly longer than a residence time in the cracking device, such as in the steam cracker, of the cracking unit (12). In one embodiment, the residence time is 3-30 seconds in the gasifier (2). In one embodiment, the residence time is 4-30 seconds in the gasifier (2). In one embodiment, the residence time is 4-20 seconds in the gasifier (2). In one embodiment, the residence time is 5-15 seconds in the gasifier (2). In one embodiment, the residence time is 10-20 seconds in the gasifier (2).

In one embodiment, the product mixture (4) is cooled after the gasifier (2). In one embodiment, the product mixture is cooled to temperature of 400-500° C. In one embodiment, the product mixture (4) is cooling before the supplying to the recovery unit (6). In one embodiment, the process arrangement comprises at least one cooling device for cooling the product mixture (4).

In one embodiment, the product mixture (4) is filtered after the gasifier (2). In one embodiment, the product mixture (4) is filtered after the cooling of the product mixture. In one embodiment, the product mixture (4) is filtered by a hot filter. Alternatively, the product mixture can be filtered by any suitable filter, cyclone or other filtration device. In one embodiment, the process arrangement comprises at least one filter (5), e.g. a hot filter or other suitable filter or filtration device, for filtering the product mixture (4). In the filtration solid components, such as solid particles or solid impurities, can be removed from the product mixture (4). In one embodiment, chlorine (Cl) and/or chlorine compounds are removed from the product mixture by injecting absorbent before gas filtration or using calcium based bed additive.

In one embodiment, the product mixture (4) comprises over 30 w-% olefins, such as ethylene and propylene, in one embodiment over 25 w-% and in one embodiment over 20 w-%. In one embodiment, the product mixture (4) comprises over 25 w-% ethylene, and in one embodiment over 20 w-%. In one embodiment, the product mixture (4) comprises over 13 w-% light aromatics, such as benzene, and in one embodiment over 10 w-%.

In one embodiment, the product mixture (4) can be supplied to the desired step in the recovery unit (6) of the hydrocarbons, e.g. to the first step or device, or to the later step or device. In one embodiment, the product mixture (4) is a portion of the feed to the recovery unit (6). In one embodiment, the product mixture (4) is used at least as the portion of the feed to the recovery unit (6). In one embodiment, the product mixture can be used as such in the feed to the recovery unit. In one embodiment, the product mixture (4) can be treated before the supply to the recovery unit (6). In one embodiment, undesired components of the product mixture, for example impurities or metals, e.g. aluminium, or heavy aromatic hydrocarbons may be removed from the product mixture (4) after the gasifier (2). In one embodiment, the aromatic hydrocarbons, e.g. heavy aromatic hydrocarbons and/or light aromatic hydrocarbons, may be removed from the product mixture (4) after the gasifier (2).

A recovery process which comprises the recovery unit (6) may be multistep process, in which desired hydrocarbons, such as hydrocarbon fractions, and/or desired other components or fractions are separated from the feed of the recovery process. The recovery process is a separation process for separating hydrocarbons in which the feed is separated into its component parts or fractions. The process arrangement comprises at least recovery unit (6) in which hydrocarbons, such as hydrocarbon fractions (7, 8, 9), are recovered. The recovery unit (6) comprises more than one device for separating desired hydrocarbons and hydrocarbons fractions. Further, other components or fractions may be separated in the recovery unit. The recovery unit (6) may comprise different devices for separating hydrocarbons or other components, such as separating devices, distillation apparatuses, cooling devices, hydrogenation devices, dewatering devices, or other suitable devices. In one embodiment, the recovery unit (6) comprises at least separating device and/or distillation apparatus. In one embodiment, the recovery unit (6) comprises at least distillation apparatus. In one embodiment, the desired hydrocarbons are separated by distillation. In one embodiment, the recovery unit (6) comprises at least separating device. In one embodiment, the desired hydrocarbons are recovered or removed by separating means of one or more separation devices. In one embodiment, carbon monoxide and/or hydrogen are recovered in the recovery unit. In one embodiment, the aromatic hydrocarbons are recovered in the recovery unit. In one embodiment, undesired components of the product mixture can be removed in the recovery unit. Any suitable separation device known per se can be used as the separation device in the process arrangement. Any suitable distillation apparatus known per se can be used as the distillation apparatus in the process arrangement. The distillation apparatus may be based on distillation, e.g. fractional distillation, or extraction distillation.

In one embodiment, the recovered hydrogen can be recirculated to a suitable process step of the process or to a desired refining process, in which the hydrogen is needed for processing. In one embodiment, the recovered carbon monoxide, aromatic hydrocarbons, tars and/or methane can be recirculated to a suitable process step of the process or to a desired reforming process, or back to the gasifier (2), for example to form energy for the gasifier or maintain temperature in the gasifier. In one embodiment, the aromatic hydrocarbons, e.g. light aromatic hydrocarbons, can be used as a final product or as a source material for chemicals.

In one embodiment, the product distribution can be adjusted based on gasification conditions in the gasifier (2) and/or the selected polymer-based waste material (1). In one embodiment, ethylene-rich product mixture is formed from the polymer-based waste (1) in the gasifier (2).

In one embodiment, undesired components of the product mixture (4), methane, hydrogen, carbon monoxide and/or the aromatic hydrocarbons, e.g. heavy aromatic hydrocarbons, are used to produce energy for the gasification or recirculated back to the gasifier (2). In one embodiment, said components and materials can be treated in a device integrated with the gasifier for producing energy. In one embodiment, the undesired components of the product mixture (4), methane, hydrogen and/or carbon monoxide can be used as energy material to provide heat to the gasifier (2). In one embodiment, the aromatic hydrocarbons, e.g. heavy aromatic hydrocarbons, are used to produce energy for the gasification, and they can be used as energy material to provide heat to the gasifier (2).

In one embodiment, the process arrangement comprises at least one recirculation device for recycling undesired components, carbon monoxide and/or aromatic hydrocarbons back to the gasifier (2). In one embodiment, the recirculation device is arranged to recirculate the aromatic hydrocarbons, carbon monoxide and/or undesired components from the recovery unit (6) to the gasifier (2).

In one embodiment, the process arrangement comprises more than one gasifier (2) for treating the polymer-based waste (1). Then the product mixtures, such as product gases, from said gasifiers (2) can be supplied to the recovery unit (6), or to the desired step or device of the recovery unit (6).

In one embodiment, the process arrangement comprises at least one first feed inlet for supplying the polymer-based waste (1) into the gasifier (2). In one embodiment, the process arrangement comprises at least one first outlet for discharging the product mixture (4) out from the gasifier (2).

In one embodiment, the process arrangement comprises at least one feed inlet of the recovery unit (6), e.g. second feed inlet, for supplying the product mixture (4) of the gasifier (2) and/or the hydrocarbon mixture (13) of the cracking unit (12) into the recovery unit (6). In one embodiment, the process arrangement comprises at least one outlet, e.g. second outlet, for discharging at least one olefin fraction (7, 8, 9) out from the recovery unit (6).

The feed inlet may be any suitable inlet known per se, e.g. pipe, port or the like. The outlet may be any suitable outlet known per se, e.g. pipe, outlet port or the like.

In one embodiment, the process arrangement comprises at least one feeding device for feeding polymer-based waste (1) to the gasifier (2). In this context, the feeding device can be any feeding device, equipment or other suitable device. In one embodiment, the feeding device is selected from the group comprising a screw, conveyor, tube, pipe, pneumatic feeding device, pneumatic conveyor, extruder, other suitable feeding device and their combinations. In one embodiment, the polymer-based waste is fed to the gasifier by means of a pneumatic feeding device or pneumatic conveyer using methane, e.g. recycled methane from this process, as a pneumatic gas.

The steam (3) can be supplied via the steam inlet to the gasifier (2). In one embodiment, the steam is fed from bottom of the gasifier to the gasifier. In one embodiment, the steam inlet is arranged in connection with the bottom of the gasifier. In one embodiment, the process arrangement comprises a distribution means, e.g. a grate, which is arranged in connection with the bottom of the gasifier for distributing the steam inside the gasifier. Any suitable steam inlets and distribution means can be used in the gasifier.

The method and process arrangement can be operated as a continuous process.

In one embodiment, the method and process arrangement are used and utilized in a production of hydrocarbons such as light hydrocarbons, olefins, e.g. ethylene, propylene and butadiene, light aromatic hydrocarbons, e.g. benzene and toluene, carbon monoxide, hydrogen, or their combinations. The products, such as hydrocarbon fractions, from the recovery unit can be used as such or can be supplied, for example, to a polymerization process, oxidation process, halogenation process, alkylation process or other chemical process, or to a production of plastic. For example, ethylene and propylene are building blocks for plastic products, petrochemical products and chemicals.

Thanks to the invention polymer-based waste can be treated and utilized easily and effectively. The desired hydrocarbons, like olefins, can be recovered. Further, light aromatic hydrocarbons, such as benzene, toluene, xylene or the like, derived from the polymer-based waste can be recovered, and heavy aromatic hydrocarbons can be recirculated and utilized in the process. In this process the waste can be upgraded. The method and process arrangement offer a possibility to treat the polymer-based waste easily, and energy- and cost-effectively.

The present invention provides an industrially applicable, simple and affordable way to produce hydrocarbons and especially olefins from the polymer-based waste. The present invention provides flexible and economically feasible way to recycle waste polyolefins back to olefins. The method and process arrangement are easy and simple to realize in connection with production processes.

Further, the recycling of the polymer-based waste can be improved by means of the invention. Further, a part of new crude oil based raw material can be replaced with the polymer-based waste. Further, no investment is needed for a recovery unit when the existing recovery process can be applied.

EXAMPLES

FIGS. 1 and 2 present the method and also process arrangement for producing hydrocarbons continuously from polymer-based waste.

The process of FIG. 1 comprises a fluidized bed gasifier (2) in which the polymer-based waste (1) is gasified with steam (3) at low temperature which is 640-750° C., for example 720-730° C., for forming a product mixture (4), a steam inlet for supplying the steam (3) to the gasifier (2), and a recovery unit (6) into which the product mixture (4) is supplied from the gasifier (2) and in which at least one desired hydrocarbon fraction (7, 8, 9) is separated. The treatment is carried out under atmospheric pressure in the gasifier (2), and the residence time is 4-30 s, in one embodiment 5-15 s, in the gasifier.

The steam (3) is fed by means of a suitable steam feed device via the steam inlet to the gasifier (2).

The product mixture (4) comprises at least ethylene, propylene and light aromatic hydrocarbons such as benzene or toluene, and further may comprise hydrogen and carbon monoxide. Further, the product mixture may comprise other hydrocarbons. Preferably, the product mixture is the ethylene rich product mixture.

In one embodiment, the product mixture (4) may be cooled, for example to temperature of 400-500° C., after the gasifier (2). In one embodiment, the process arrangement may comprise at least one filtering device (5), e.g. a hot filter, for filtering the product mixture (4) and for removing solid components from the product mixture after the gasifier, for example after the cooling of the product mixture.

The product mixture (4) can be supplied to a desired step or device in the recovery unit (6) of the hydrocarbons. The product mixture (4) is a portion of the feed to the recovery unit (6). In the recovery unit (6) at least desired hydrocarbons or hydrocarbon fractions are recovered, e.g. ethylene (7), propylene (8) and aromatic hydrocarbons (9). The recovery unit (6) comprises different devices for separating desired hydrocarbons, such as separating devices, distillation apparatuses, cooling devices, hydrogenation devices, dewatering devices or other suitable devices. Preferably, the recovery unit (6) comprises at least separating device and/or distillation apparatus. The hydrocarbon fractions (7, 8, 9) are separated by separation and/or distillation in the recovery unit (6).

Further, the carbon monoxide, hydrogen, methane, aromatic hydrocarbons (9) and/or other undesired components may be recovered in the recovery unit (6). The recovered hydrogen may be recirculated to a suitable process step of the process or to a desired refining process, in which the hydrogen is needed for processing. The recovered carbon monoxide, aromatic hydrocarbons, methane and/or other undesired components may be recirculated to a suitable process step of the process, or back to the gasifier (2). Said components may be recirculated back to the gasifier to produce energy, temperature and/or steam for the gasification. The process arrangement may comprise at least one recirculation device for recycling carbon monoxide, methane and/or undesired components from the recovery unit (6) back to the gasifier (2). The process arrangement may comprise at least one recirculation device for recycling the aromatic hydrocarbons (9), e.g. heavy aromatic hydrocarbons (10), from the recovery unit (6) back to the gasifier (2). Alternatively, the aromatic hydrocarbons, e.g. light aromatic hydrocarbons, can be used as a final product or as a source material for chemicals.

According to FIG. 2, the gasifier (2) is arranged in parallel with a known cracker unit (12), which comprises at least one cracking device such as a steam cracker. In said cracking unit (12), a hydrocarbon mixture (13) is produced by cracking from other raw material (11), such as fossil raw material. Then both the product mixture (4) from the gasifier (2) and the hydrocarbon mixture (13) from the cracking unit (12) can be supplied the recovery unit (6), or to the desired step or device of the recovery unit (6), and the product mixture (4) is the portion of the feed to the recovery unit (6).

Example 1

The process was studied in a bench scale bubbling fluidized bed gasifier.

Polyethylene based waste was used as a feed and steam was used as a gasification agent in the gasifier. Low gasification temperatures were used, and the temperatures were between 690-730° C. in the gasifier. The residence time was about 4-8 s in the gasifier. A product gas was formed during the gasification in the gasifier. Five test periods have been carried out and analysed.

In olefin industry, an olefin mixture comprising, for example, ethylene and propylene are normally produced by cracking and treating naphtha, ethane or propane in a cracking unit, and olefins are recovered from the olefin mixture by multistep recovery process.

It was observed from the tests that the main components in the dry product gas were: 28.1-33.3 vol-% $H_2$, 20.0-27.7 vol-% $CH_4$ and 21.1-26.5 vol-% $C_2H_4$, and in additional tests 22.2-39.3 vol-% $C_2H_4$. The product gas was surprisingly rich in ethylene. The results were compared with results from the olefin mixture of the conventional naphtha cracker, in which the olefin mixture contains 1.03 vol-% $H_2$+CO, 15.35 vol-% $CH_4$ and 31.02 vol-% $C_2H_4$. The product distribution of the product gas was quite similar than the conventional product distribution of the olefin mixture from the naphtha cracker. Further, it was observed from the tests that the product gas had high tar loading. However, no filtration problems were observed. Thus, the mixture of the product gas, comprising at least ethylene, and further aromatic hydrocarbons, e.g. tars, was suitable feedstock for the downstream process of the conventional olefin recovery process or recovery unit. The steam gasifier according to the present invention can be installed parallelly with the conventional naphtha cracker enabling partial replacement of virgin naphtha by means of recycled polyolefins.

Example 2

The process was studied in a bench scale bubbling fluidized bed gasifier.

In the gasifier the polymer-based feed was gasified with steam at low temperature which is 700-720° C. for forming a product mixture.

Polyethylene material was used as a feed in the first test, and mixed plastic material, which is not suitable for mechanical recycling, was used as a feed in the second test. The bed material was sand or a mixture of sand and dolomite in the tests.

In the first test, the product mixture comprised ethylene, propylene and light aromatic hydrocarbons such as benzene, and further comprised hydrogen, methane and other hydrocarbons. Further, the product mixture comprised carbon dioxide and carbon monoxide. In PL-9 and PL-16 sand was used as the bed material, and in PL-6 the mixture of the dolomite and sand (dolomite:sand was 50:50) was used as the bed material. The temperature was 705° C. and fluidizing velocity was 0.31 m/s in PL-6 and PL-9 gasifications, and the temperature was 720° C. and fluidizing velocity was 0.5 m/s in Pl-16 gasification. The yield of the product components per polyethylene material feed, as dry product gas, is presented in Table 1.

TABLE 1

| Yield, g/kg polyethylene material feed (dry) | | | |
|---|---|---|---|
| | PL-6 | PL-9 | PL-16 |
| H2 (2.02 g/mol) | 28.8 | 12.3 | 10.5 |
| CH4 (16.05 g/mol) | 179.8 | 176.3 | 166.2 |
| C2H2 (26.04 g/mol) | 3.3 | 2.9 | 4.0 |
| C2H4 (28.06 g/mol) | 352.0 | 336.8 | 341.6 |
| C2H6 (30.08 g/mol) | 56.5 | 39.3 | 38.7 |
| C3H6 (42.09 g/mol) | 79.0 | 76.5 | 88.1 |
| Other hydrocarbons C3Hy + C4Hy + C5Hy (e.g. C4H6, 56.10 g/mol) | 40.2 | 39.6 | 10.6 |
| Benzene | 112.5 | 151.5 | 141.9 |
| Tars | 157.4 | 196.9 | 184.7 |

In the first test, it was observed that high olefin yield can be achieved. Further, it was observed that the product gas comprised tar, i.e. condensable hydrocarbon compounds including for example aromatic compounds. However, no filtration problems were observed. Further, from the PL-6 it was observed that the dolomite addition (dolomite:sand was 50:50) in the bed material increased the olefin yield.

In the second test, the product mixture comprised ethylene, propylene and light aromatic hydrocarbons such as benzene, and further comprised hydrogen, methane and other hydrocarbons. Further, the product mixture comprised carbon dioxide and carbon monoxide. In NP-12 sand was used as the bed material. The temperature was 720° C. and fluidized velocity was 0.31 m/s in NP-12 gasification. The yield of the product components per polyethylene material feed, as dry product gas, is presented in Table 2.

TABLE 2

| Yield, g/kg polyethylene material feed (dry) | |
|---|---|
| | NP-12 |
| H2 (2.02 g/mol) | 20.9 |
| CH4 (16.05 g/mol) | 144.5 |
| C2H2 (26.04 g/mol) | 3.5 |
| C2H4 (28.06 g/mol) | 200.4 |
| C2H6 (30.08 g/mol) | 25.4 |
| C3H6 (42.09 g/mol) | 36.2 |
| Other hydrocarbons C3Hy + C4Hy + C5Hy (e.g. C4H6, 56.10 g/mol) | 0.6 |
| Benzene | 137.0 |
| Tars | 205.7 |

In the second test, it was observed that high olefin yield can be achieved. Further, it was observed that the product gas comprised tar, i.e. condensable hydrocarbon compounds including for example aromatic compounds. However, no filtration problems were observed.

The devices and equipments of the process used in these examples are known per se in the art, and therefore they are not described in any more detail in this context.

The method and process arrangement are suitable in different embodiments for producing hydrocarbons from different polymer-based waste.

The invention is not limited merely to the examples referred to above; instead many variations are possible within the scope of the inventive idea defined by the claims.

The invention claimed is:

1. A method for producing hydrocarbons from polymer-based waste, wherein the method comprises:
   arranging a gasifier in parallel with at least one cracking unit, wherein the gasifier is a fluidized bed gasifier;
   supplying polymer-based waste to the gasifier and gasifying the polymer-based waste with steam at a temperature of 640-750° C. and at a pressure of below 4 bar in the gasifier for forming a product mixture comprising at least olefins;
   supplying raw material to a cracking device of the cracking unit and producing a hydrocarbon mixture comprising olefins from the raw material in at least one cracking unit; and
   supplying the product mixture of the gasifier and the hydrocarbon mixture of the cracking unit to a recovery unit of the hydrocarbons for separating at least one hydrocarbon fraction.

2. The method according to claim 1, wherein the gasifier has a temperature of 700-750° C.

3. The method according to claim 1, wherein the gasifier has a temperature of 700-720° C.

4. The method according to claim 1, wherein bed material is sand and/or calcium-containing bed material in a fluidized bed of the gasifier.

5. The method according to claim 1, wherein the polymer-based waste comprises at least polyolefins and other polymers.

6. The method according to claim 1, wherein residence time is 4-30 seconds in the gasifier.

7. The method according to claim 1, wherein the product mixture is cooled to temperature of 400-500° C. after the gasifier.

8. The method according to claim 1, wherein the product mixture is filtered after the gasifier.

9. The method according to claim 1, wherein the product mixture comprises at least ethylene, propylene and light aromatic hydrocarbons.

10. The method according to claim 1, wherein aromatic hydrocarbons are recovered.

11. The method according to claim 1, wherein undesired components of the product mixture and/or aromatic hydrocarbons are used to produce energy for the gasification.

12. The method according to claim 1, wherein the separated at least one hydrocarbon fraction further comprises separating hydrocarbons, light aromatic hydrocarbons, carbon monoxide, hydrogen, or their combinations.

* * * * *